March 3, 1931.  J. S. BIRTCIEL  1,795,005
DOMESTIC GAS PLANT
Filed Aug. 22, 1927
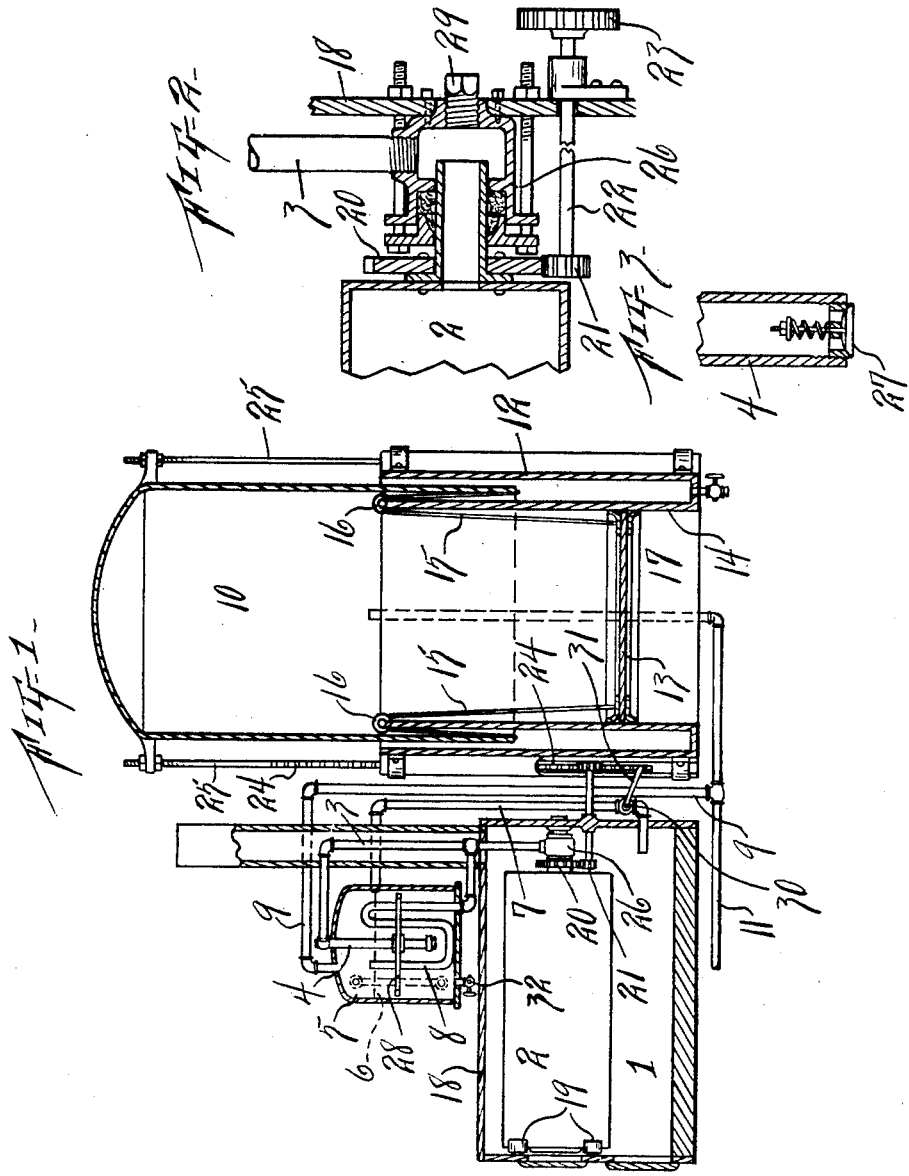
Inventor
JOSEPH S. BIRTCIEL
By A. L. Jackson
Attorney Patented Mar. 3, 1931

1,795,005

UNITED STATES PATENT OFFICE

JOSEPH S. BIRTCIEL, OF FORT WORTH, TEXAS, ASSIGNOR, BY DIRECT AND MESNE ASSIGNMENTS, OF ONE-FOURTH TO E. A. RODGERS, ONE-FOURTH TO JOHN S. FOGARTY, AND ONE-FOURTH TO GERALD REDMOND, ALL OF FORT WORTH, TEXAS, AND ONE-FOURTH TO HOMER L. BAUGHMAN

DOMESTIC GAS PLANT

Application filed August 22, 1927. Serial No. 214,466.

My invention relates to gas making plants and more particularly to an apparatus for producing gas and oil from vegetable matters; and the object is to provide plants for producing gas and oil from vegetable matter and to make gas from oil and to provide an apparatus of any capacity required and particularly to produce a small sized plant or plants of small capacity so that individual consumers can own and use their own gas producing plants and to provide plants of any required capacity, and to provide plants at small cost which will be highly efficient and economical in producing gas and oils, and which will afford great convenience in places remote from gas producing plants of large capacity. Other objects and advantages will be fully explained in the following description and the invention will be more particularly pointed out in the claims.

Reference is had to the accompanying drawings which form a part of this application.

Fig. 1 is a vertical section of the several containers, showing the internal and external arrangement of pipes and other elements.

Fig. 2 is a broken vertical sectional view on a larger scale of the outlet pipe connection with the cracking chamber.

Fig. 3 is a vertical sectional detail view of the check valve for the discharge pipe.

Similar characters of reference are used to indicate the same parts throughout the several views.

The gas generating apparatus is provided with a furnace or fire box 1 into which is fed vegetable matter to be burned to furnish heat to be used for gas generating or cracking the matter which is to be placed in the cracking chamber or retort 2. Vegetable matter and oils are placed in the chamber 2 and heated by the heat from fire box 1. A mixture of distillation gases and vapors is produced in chamber 2 and passes out through pipe 3 and is delivered to the separating chamber 5 by the discharge pipe 4. In the preliminary operation water is placed in the separator tank 5 up to the line 6. The mixture of distillation gases and vapors from the pipe 4 is discharged below the dotted water line 6 and the oil and water are separated or condensed out of the mixed gases and vapors in the tank 5. A part of the separated oil from tank 5 can then be used to heat the fire box 1 by delivering oil from the tank 5 down the pipe 7 to the fire box 1 for heating the fire box. The cracking chamber 2 must be replenished with vegetable matter from time to time to produce gas and oils. After the distillation process has been completed or when the distillation process is not in operation, a part of the oil from chamber 5 can be used in the cracking chamber with the vegetable matter by running the oil down through the pipe 8 which delivers oil to the pipe 3 which delivers oil to the chamber 2. The gas is separated from the oil in tank 5 and the gas goes out through pipe 9 and is delivered to a gas holder having a bell 10. Gas for service purposes may be taken from pipe 9 through a pipe 11. A diaphragm 28 is mounted on pipe 4 to spread the gases to outer portions of the separator 5 for cooling the gases. The gas is stored in the gas holder bell 10 and the bell 10 rests in water in the tank 12 by which the seal is effected. A piston 13 is mounted in a cylinder 14 and as the volume of gas increases, the bell will rise and the piston 13 will move downwardly. The piston 13 is suspended by cords 15 which run over antifriction rollers 16 and this balances the pressure in the cylinder 14 and the bell 10. The cylinder 14 is provided with an open end 17 to let air out of the cylinder 14 as the piston 13 goes down. The cracking chamber may be made stationary or revoluble.

The cracking chamber 2 is supported by a frame 18 (which is an extension of the fire box 1) and rollers 19 which are operatively connected at one end to the frame 18 and at the other end, the separator is supported by a pipe connection for pipe 3 and the stuffing box 26 which is supported by the frame 18. The pipe 3 is connected through the stuffing box 26 into the chamber 2. The cylinder 2 is revolved by the rising and falling of the gas holder bell 10. A gear wheel 20 is rigid with chamber 2 and is driven by a pinion 21 which is carried and driven by a shaft 22 which is driven by a gear wheel 23 and the wheel 23 is driven by a rack 24 which is formed on the guide member 25.

An automatic cut-off 30 is provided for cutting off oils from furnace 1 and this cut-off is actuated by means of a lever 31 and this lever is actuated by the rack 24. The cut-off is actuated when the gas bell 10 is approximately full of gas and the object is to stop the generation of gas.

When the cylinders 2 and 5 are cooling off, there is created a vacuum in chamber 2 and a check valve 27 is provided for preventing the oil from being drawn out of separator 5 during the cooling of the cylinders.

Oil, gas from pipe 11, or wood, or waste material, can be used in the fire box to heat the matter which is to be placed in the cracking chamber 2 to produce vapors of oil and gas to be delivered to the separating chamber 5 to produce vapors of oil and gas to be delivered to the separating chamber 5. A cock 32 is provided for drawing oil from chamber 5.

What I claim, is,—

1. A domestic gas plant comprising a furnace, a gasifying retort adapted to contain gas producing material revolubly mounted in said furnace, a separating chamber operatively connected to said cracking chamber for separating gas from oil, a gas holder bell operatively connected to said separating chamber and adapted to rise and fall as the amount of gas in the said bell varies, and gearing operatively connected to said cracking chamber and said gas holder bell for revolving said cracking chamber as the gas holder bell rises and falls.

2. A domestic gas plant comprising a furnace, a gasifying retort adapted to contain gas producing material revolubly mounted in said furnace, a separating chamber operatively connected to said cracking chamber for separating gas and oil, means for removing oil from said separating chamber, a gas holder bell operatively connected to said separating chamber for taking gas therefrom, means for sealing the gas in said bell as said bell rises and falls, and gearing operatively connected to said cracking chamber and to said gas bell for revolving said cracking chamber as said gas bell rises and falls.

3. A domestic gas plant comprising a furnace, a gasifying retort adapted to contain gas producing material inclosed in said furnace, a separating chamber operatively connected to said cracking chamber for separating gas from oil, means for conveying heated gas and oil vapors into said separating chamber, a gas holder bell operatively connected to said separating chamber for collecting gas therefrom, a tank for said gas holder bell containing sealing material, an inner cylinder rigid with said tank and projecting within said gas holder bell, a piston in said inner cylinder, and means operatively connected to said piston and said gas holder bell whereby said gas holder bell moves said piston vertically.

In testimony whereof, I set my hand this 11th day of July, 1927.

JOSEPH S. BIRTCIEL.